E. M. SLOCUM.
PROCESS FOR TREATING LATEX AND PRODUCT OBTAINED THEREBY.
APPLICATION FILED JAN. 30, 1917.
1,332,925.
Patented Mar. 9, 1920.
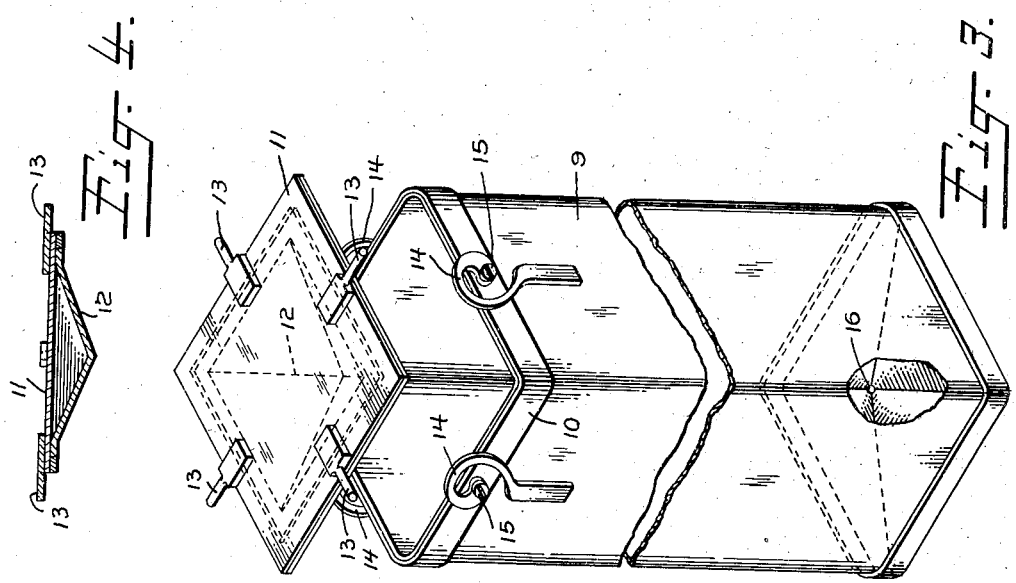
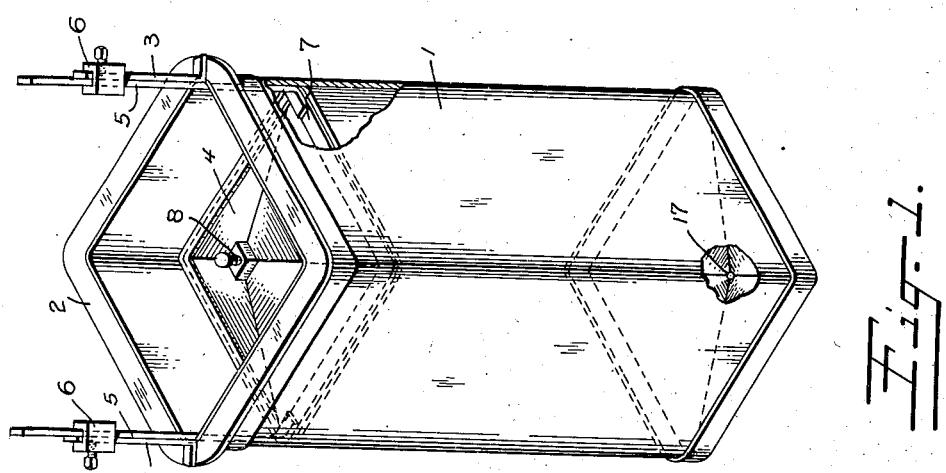
WITNESSES:
INVENTOR
Edward M. Slocum,
BY
HIS ATTORNEY

UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

PROCESS FOR TREATING LATEX AND PRODUCT OBTAINED THEREBY.

1,332,925.   Specification of Letters Patent.   Patented Mar. 9, 1920.

Application filed January 30, 1917. Serial No. 145,373.

*To all whom it may concern:*

Be it known that I, EDWARD MARK SLOCUM, a citizen of the United States, residing at Medan, Province of Deli, Sumatra, Dutch East Indies, have invented certain new and useful Improvements in Processes for Treating Latex and Products Obtained Thereby, of which the following is a full, clear, and exact description.

This invention relates to processes for treating latex and similar material and the products obtained thereby. It is more particularly directed to a process for collecting and coagulating latex and preparing the same for vulcanization and the coagulum obtained by such process.

Transportation of latex from trees to factory occurs in two stages—first, from the trees to the collecting sheds, and second, from the collecting sheds to the factory. The first stage is accomplished by coolies; the second, by automobile trucks, or other vehicles. In both stages the latex is ordinarily held in partially filled open containers. The latter permit contact with air and sunlight and jostling of their contents. Exposure to air and sunlight at any time during the transportation, particularly before coagulation, results in absorption of putrefactive bacteria, molds, etc., as well as discoloring of the rubber through the oxidase reaction. Agitation of the latex produces fractional coagulation or lump formation. If the latex arrives at the factory in fluid condition, such lumps must be removed by sieving. Such sieving is, however, a tedious and expensive operation, and produces a non-homogenous rubber, since the lumps contain more caoutchouc than the remaining latex. Acetic acid is ordinarily added at the collecting sheds in order to prevent the large proportion of lump formation which occurs in uncoagulated latex during the period of transportation between collecting sheds and factory. It would be more economical to avoid the coagulation by acetic acid and to utilize the transportation period mentioned for natural coagulation, but this has been impracticable in the past due to the results of exposure to the air and lump formation mentioned.

The principal object of the present invention accordingly, is to devise a simple, efficient process which will overcome the objections noted, which shall permit the utilization of the transportation period between the collecting sheds and factory, and which at the same time shall permit the introduction of a new factor in coagulation, namely, pressure preferably developed through the coagulation-expansion of the latex. Another object is to provide an improved coagulum as a result of such process.

Briefly stated, my invention consists in confining latex adapted to expand upon coagulation in a chamber, substantially preventing the flow thereof in the chamber upon the movement of the latter, coagulating the latex while subjecting the same to pressure developed through resistance of the walls of the chamber to the expansive force of coagulation and adding a vulcanizing agent thereto.

In carrying out my process in its preferred form, containers of the type shown in the accompanying drawings are preferably employed. In these drawings Figure 1 represents a perspective view partially broken away, of a form of collecting-can which may be employed for the transportation of the latex from the trees to the collecting sheds and which may also be used for coagulation; Fig. 2 is a cross-sectional evelation of the top thereof; Fig. 3 is a perspective view partially broken away, of a preferred form of a transportation can adapted for coagulation; and Fig. 4 is a cross-sectional elevation of the top thereof.

In carrying out the preliminary steps of the process, namely, the collecting of the latex by coolies and its delivery to the collecting sheds, the can shown in Figs. 1 and 2 is preferably employed. This can comprises an oblong body portion 1 of substantially square cross-section, having rounded corners and preferably made of sheet steel or similar material. The can is provided with a flanged lip 2, and at diagonally opposite corners thereof are mounted short uprights 3. A removable cover 4, having a smooth, approximately pyramid-shaped dome, is adapted to move up and down within the can. Its position can be adjusted by means of the upright rods 5 positioned at diagonally opposite corners thereof, which slide along the rods 3 and may be held in position with respect thereto by means of the collar 6. The edge of the cover is provided with a rubber gasket 7 to secure a tight fit. The latex is poured from the latex cups into this can, preferably passing through a filtering funnel. When sufficient latex has been placed in the can, the adjustable cover 4 is lowered until the latex rises to the apex of the pyramid. The apex is provided with a vent 8 through which air may be forced out and when the latex has reached this vent, a cap may be screwed thereon to completely seal the chamber, the volume of which will thus substantially equal that of the latex. By thus filling the can jostling is prevented and air is excluded. Thus in this preliminary process the formation of lump and excessive collection of bacteria from the air is substantially avoided.

In carrying out the process after receipt of the latex at the collecting shed, the latex is placed in the transportation can shown in Figs. 3 and 4 for conveyance to the processing center. This transport can is larger and of heavier material than the collecting can above described, but is similar thereto. It will be understood, of course, that the size, shape and strength of both types of cans may be varied to suit the conditions of use. The transport can comprises an oblong body portion 9, substantially of square cross-section, around the upper edge of which is a strengthening band 10. The can is made of rigid material, preferably sheet steel, interiorly tinned to prevent discoloration, and is provided with rounded corners. The substantially square cover 11 is provided at one side with a hollow, smooth pyramid 12, whose apex projects downwardly into the interior of the can. Secured at the base of the pyramid is a rubber gasket. Secured near the edges and having a portion projecting therebeyond are fingers 13 which cooperate with substantially U-shaped eccentric clamps or hooks 14 which are pivotally held by bolts 15 passing through the upper extremity of the hook and fastening the latter at points along the band 10, corresponding to positions of the fingers 13. The cover may be secured by rotating these hooks to admit the fingers 13, thus engaging the fingers therewith by further rotation until the fingers lie within the curve adjacent the pivotal bolts 15 and the shank of the hooks lie downward in the position shown in Fig. 3.

The latex from the collecting can is poured into the transport can to a mark previously made on the interior of the body portion 9 at a given distance below the upper edge. A fixed quantity of antiseptic material, preferably one or more of the following materials, may then be added to the latex in order to prevent the action of bacteria, etc. Certain of these chemicals have been specifically set forth as antiseptic agents in other of my co-pending applications: 0.2% beta-naphthol, 0.1% sodium fluorid, 0.5% pine tar creosote dissolved in sodium cresylate solution, 0.1% hexamethylenetetramin.

The quantities are based on the weight of the latex taken. These disinfecting solutions may be added to the latex in any desired manner, and where there is danger of improper mixing, the solution may be introduced by spraying and stirring into the latex. When thus made antiseptic the latex may be coagulated. This may be accomplished by the addition of an artificial coagulent thereto, or natural coagulation may be allowed to take place. Where artificial coagulation is carried on, acetic acid or other coagulant is added to the latex in the transport can, in addition to the antiseptic. The cover 11 is then placed on the can with its pyramid-shaped portion projecting into the interior thereof and clamped by means of the hooks, as heretofore set forth. The depth of this pyramid is approximately one and two thirds times the distance of the surface of the latex from the upper edge of the can. With a properly dimensioned pyramid the volume of the chamber upon insertion of the cover, will substantially equal that of the latex filling the chamber to the mark, as indicated. As the pyramid is inserted in the can the latex rises along the sides thereof and displaces the air until the cover is seated when all the air will have been forced out.

In the case where natural coagulation is allowed to take place, no coagulant is added, but the cover is placed on the can after the addition of the antiseptics and coagulation takes place preferably at normal temperature. In case no antiseptic is employed, the amount of latex is increased to make up for the volume of the antiseptic ordinarily employed, and the can is covered and coagulation is allowed to take place in the usual manner.

The expansion of latex when antiseptics are not combined therewith may vary from 40% to 100% of the original volume of the latex. Ordinarily, expansion is approximately 50% of the volume. The expansion of latex having an antiseptic mixed therewith, although it may be as low as approximately 4% where sodium fluorid and hexamethylenetetramin are employed, is usually considerable. The expansion of the latex is taken advantage of in connection with the coagulation thereof, the rigid walls of the transport can being well adapted to withstand pressure. The cover being firmly clamped in place rigidly maintains the interior volume of the can fixed while coagulation takes place. Under such conditions the latex is subjected to the pressure of its own coagulation expansion which is preferably maintained until coagulation is complete. The pressure, of course, may be continued for several days, or for any desired time after coagulation. After the necessary period of pressure, a compressed air pipe is attached at vent 16, the cover is removed, and the coagulum is blown out.

Among the advantages accruing from the process as outlined are the following: The latex may be transported during the period in which it is coagulating without danger of the formation of lumps due to jostling or agitation. Since coagulation occurs in the absence of air, even if no antiseptic agent is added, the resulting latex is less apt to contain putrefactive bacteria than in the case where the latex is exposed during coagulation, as has formerly been the case. Furthermore, the oxidase reaction is prevented.

The process also employs the entire capacity of the transport cans, whereas, heretofore only part of the capacity could be employed due to the allowance necessary for expansion. It has been found by the use of pressure of coagulation-expansion, that a tougher and more closely grained rubber is obtained and one which may be more conveniently pressed and compacted, due to the smaller space which it occupies. The toughness of the coagulum is testified to by the resistance which it offers to dislodgment from the coagulation can. Further, the milling of the rubber in the usual mills has resulted in certain instances in the breaking of the mill. In view of the toughness of the coagulum it is preferable to add sulfur or other vulcanizing agent and any compounding materials prior to coagulation, although it will be understood that such addition may be made subsequent thereto or at any desired time prior to vulcanization.

It will thus be seen that among others, the objects of the invention heretofore set forth are fully achieved.

It will be observed that the collecting can may also be used to coagulate latex under pressure, by clamping the collar 6 to hold the cover 4 in fixed position. Under these circumstances the pressure of the walls of the container will resist the coagulation-expansion in a similar manner to that detailed in connection with the transport can and the resultant coagulum will be similar to that obtained by the use of the latter can. The coagulum may be removed from this can in a similar manner to that employed in connection with the transport can, compressed air being introduced through vent 8 to remove the cover and through vent 17 in the bottom of the can to blow out the coagulum.

As many apparently widely different embodiments of this invention could be made without departing from the spirit thereof it is to be understood that I do not intend to limit myself to the specific embodiment herein set forth, except as indicated in the appended claims.

Having thus described my invention what I claim and desire to protect by Letters Patent is:

1. In a process of the kind described, coagulating rubber-producing and similar latex, restraining the expansion of the latex during coagulation in the absence of applied fluid pressure, whereby the said latex will be subjected to a gradually increasing pressure during its coagulation, and adding a vulcanizing agent thereto.

2. In a process of the kind described, coagulating rubber-producing or similar latex, subjecting said latex to a gradually increasing pressure without heating during coagulation and adding a vulcanizing agent thereto.

3. In a process of the kind described, coagulating rubber-producing or similar latex adapted to expand upon coagulation while the latex is maintained at a substantially normal temperature, confining the latex whereby, during coagulation, it will be subjected to a gradually increased pressure, and adding a vulcanizing agent thereto.

4. In a process of the kind described, confining rubber-producing or similar latex adapted to expand upon coagulation in an inclosed space having the same volume substantially as the latex, coagulating the latex under the pressure of its coagulation-expansion and adding a vulcanizing agent thereto.

5. In a process of the kind described, partially filling a receptacle with a mass of rubber-producing or similar latex, confining the latex to prevent substantially the flow of the mass back and forth upon movement of the receptacle and adding a vulcanizing agent thereto.

6. In a process of the kind described, partially filling a chamber with rubber-producing or similar latex, adjusting the volume of the chamber to equal substantially that of the latex, coagulating the latex, and adding a vulcanizing agent thereto.

7. In a process of the kind described, partially filling a chamber with rubber-producing or similar latex, disposing an adjusting member in said chamber, thereby adjusting the volume of the chamber to equal substantially that of the latex, coagulating the latex, and adding a vulcanizing agent.

8. In a process of the kind described, confining a quantity of rubber-producing or similar latex in a chamber, disposing an adjusting cover thereon having a portion projecting into said chamber thereby adjusting the volume of the chamber to equal substantially that of the latex, coagulating the latex and adding a vulcanizing agent thereto.

9. In a process of the kind described, confining a quantity of rubber-producing or similar latex in a chamber, disposing a substantially pyramid-shaped adjusting cover in said chamber, thereby adjusting the volume of the chamber to equal substantially that of the latex, coagulating the latex, and adding a vulcanizing agent thereto.

10. In a process of the kind described, confining a quantity of rubber-producing or similar latex in a chamber, inserting an inverted substantially pyramid-shaped adjusting closure in said chamber thereby adjusting the volume of the chamber to equal substantially that of the latex and causing the latex to rise on the sides of the pyramid-shaped closure, coagulating the latex, and adding a vulcanizing agent thereto.

11. In a process of the kind described, confining a mass of rubber producing or similar latex in a container, substantially preventing the flow of the mass back and forth upon movement of the container, coagulating the latex, subjecting the latex to a gradually increasing pressure without changing its normal temperature during coagulation, and adding a vulcanizing agent thereto.

12. In a process of the kind described, confining a quantity of rubber-producing or similar latex adapted to expand upon coagulation in a container, substantially preventing the flow thereof in said container upon movement of the same, coagulating the latex while subjecting the latex to pressure developed through the resistance of the walls of the container to the expansive force of coagulation, and adding a vulcanizing agent thereto.

13. In a process of the kind described, partially filling a chamber with rubber-producing or similar latex adapted to expand upon coagulation, adjusting the volume of said chamber to equal substantially that of the latex, rigidly maintaining the volume of the chamber fixed while coagulating the latex, thereby subjecting the latex to pressure of its own coagulation-expansion, and adding a vulcanizing agent thereto.

14. In a process of the kind described, partially filling a chamber with rubber-producing or similar latex, adjusting the volume of the chamber to equal substantially that of the latex, adding an antiseptic agent to said latex, coagulating said latex, and adding a vulcanizing agent thereto.

15. In a process of the kind described, partially filling a chamber with rubber producing or similar latex, adapted to expand upon coagulation, adjusting the volume of said chamber to equal substantially that of said latex, adding an antiseptic agent to said latex, rigidly maintaining the volume of the chamber fixed while coagulating the latex, thereby subjecting the latex to the pressure of its own coagulation-expansion, and adding a vulcanizing agent thereto.

16. In a process of the kind described, partially filling a chamber with rubber-producing or similar latex adapted to expand upon coagulation, disposing a substantially pyramid-shaped adjusting cover in said chamber, thereby adjusting the volume of the chamber to equal substantially that of said latex, rigidly maintaining the volume of the chamber fixed while coagulating said latex, thereby subjecting said latex to the pressure of its own coagulation-expansion, and adding a vulcanizing agent thereto.

17. A close-grained rubber coagulum coagulated under mechanical pressure.

18. A close-grained rubber-coagulum coagulated under the pressure of its coagulation-expansion.

19. A tough, close-grained rubber coagulum coagulated under pressure without heat.

20. An antiseptic, substantially homogeneous, close-grained rubber-coagulum coagulated under the pressure of its coagulation-expansion.

21. In a process of the kind described, coagulating rubber-producing or similar latex and subjecting said latex to a gradually increasing pressure without heating during coagulation.

22. In a process of the kind described, coagulating rubber-producing or similar latex adapted to expand upon coagulation while the latex is maintained at a substantially normal temperature, and confining the latex whereby, during coagulation, it will be subjected to a gradually increased pressure.

23. In a process of the kind described, coagulating rubber-producing or similar latex adapted to expand upon coagulation, and confining the latex within an area less than its normal coagulation-expansion area, whereby the latex will be subjected to a gradually increased pressure during its coagulation.

24. In a process of the kind described, confining rubber-producing or similar latex adapted to expand upon coagulation in an inclosed space having the same volume substantially as the latex and coagulating the latex under the pressure of its coagulation-expansion.

25. In a process of the kind described, partially filling a receptacle with a mass of rubber-producing or similar latex and confining the latex to prevent substantially the flow of the mass back and forth upon movement of the receptacles.

26. In a process of the kind described, partially filling a chamber with rubber-producing or similar latex, adjusting the volume of the chamber to equal substantially that of the latex, and coagulating the latex.

27. In a process of the kind described, partially filling a chamber with rubber-producing or similar latex, disposing an adjusting member in said chamber, thereby adjusting the volume of the chamber to equal substantially that of the latex, and coagulating the latex.

28. In a process of the kind described, confining a quantity of rubber-producing or similar latex in a chamber, disposing an adjusting cover thereon having a portion projecting into said chamber, thereby adjusting the volume of the chamber to equal substantially that of the latex and coagulating the latex.

29. In a process of the kind described, confining a quantity of rubber-producing or similar latex in a chamber, disposing a substantially pyramid-shaped adjusting cover in said chamber, thereby adjusting the volume of the chamber to equal substantially that of the latex, and coagulating the latex.

30. In a process of the kind described, confining a quantity of rubber-producing or similar latex in a chamber, inserting an inverted substantially pyramid-shaped adjusting closure in said chamber thereby adjusting the volume of the chamber to equal substantially that of the latex and causing the latex to rise on the sides of the pyramid-shaped closure, and coagulating the latex.

31. In a process of the kind described, confining a quantity of rubber-producing or similar latex adapted to expand upon coagulation in a container, substantially preventing the flow thereof in said container upon movement of the same, and coagulating the latex while subjecting the latex to pressure developed through the resistance of the walls of the container to the expansive force of coagulation.

32. In a process of the kind described, partially filling a chamber with rubber-producing or similar latex adapted to expand upon coagulation, adjusting the volume of said chamber to equal substantially that of the latex, and rigidly maintaining the volume of the chamber fixed while coagulating the latex, thereby subjecting the latex to pressure of its own coagulation-expansion.

33. In a process of the kind described, partially filling a chamber with rubber-producing or similar latex, adjusting the volume of the chamber to equal substantially that of the latex, adding an antiseptic agent to said latex, and coagulating said latex.

34. In a process of the kind described, partially filling a chamber with rubber-producing or similar latex adapted to expand upon coagulation, adjusting the volume of said chamber to equal substantially that of said latex, adding an antiseptic agent to said latex, and rigidly maintaining the volume of the chamber fixed while coagulating the latex, thereby subjecting the latex to the pressure of its own coagulation-expansion.

35. In a process of the kind described, partially filling a chamber with rubber-producing or similar latex adapted to expand upon coagulation, disposing a substantially pyramid-shaped adjusting cover in said chamber, thereby adjusting the volume of the chamber to equal substantially that of said latex, and rigidly maintaining the volume of the chamber fixed while coagulating said latex, thereby subjecting said latex to the pressure of its own coagulation-expansion.

Signed at New York, county of New York, State of New York, this 5 day of January, 1917.

EDWARD MARK SLOCUM.